United States Patent Office 3,525,704
Patented Aug. 25, 1970

3,525,704
LITHOGRAPHIC IMAGE LACQUER CONTAINING AN ACRYLIC ESTER TERPOLYMER

Ronald M. Stimson and Gilden R. Van Norman, Rochester, N.Y., assignors to Eastman Kodak Company, Rochester, N.Y., a corporation of New Jersey No Drawing. Filed Aug. 29, 1967, Ser. No. 663,958
Int. Cl. C09d 3/76, 3/80
U.S. Cl. 260—17.3 21 Claims

ABSTRACT OF THE DISCLOSURE

A lithographic printing plate image lacquer having an aqueous phase and a resinous phase with a vinylidene chloride-acrylonitrile-lower alkyl acrylic ester terpolymer included in the resinous phase; especially efficacious lower alkyl acrylic ester moieties are typified by those derived from methyl acrylate and methyl methacrylate.

This invention relates to planographic printing plate lacquers.

In the preparation of lithographic printing plates, it is customary to expose a light-sensitive, resinous material to actinic light after which the unhardened resin is removed from the plate. In some systems, the unhardened areas are in the unexposed portions of the plate. The resin which is left on the printing plate is then lacquered to give a long-wearing printing surface. These lacquers must have characteristics which permit their adsorption in the hydrophobic areas without leaving a residual oil-phase material in the non-image areas. These lacquers should be inert to the action of ink, ink solvents, and the fountain solution chemicals including water. They should be non-blinding in the image areas and be non-tacky and scratch-resistant during and after processing.

Many of the prior art lacquers have been useful in providing some of the necessary characteristics but have not been entirely satisfactory in all respects. Therefore, there has been a need for improved lacquers, particularly those which would have wide adaptability for various light-sensitive coatings including the diazo resins which are commonly used and which may be obtained on presensitized printing plates. They should be adaptable to other light-sensitive resins used in lithography as well as to the dichromatic-albumen type coatings.

We have found a lacquer for use on lithographic printing plates which can be applied to the image areas of both negative and positive type printing plates which provides longer press life and which has other desirable printing characteristics.

One object of this invention is to provide a lacquer for image areas on lithographic printing plate which overcomes the difficulties experienced with prior art lacquers. Another object is to provide a laquer which provides an intensely colored image by being preferentially adsorbed in the hydrophobic areas. A further object is to provide a lacquer which gives a sharp cut off at the boundary of the image and the non-image areas and which leaves no residual colored, oil-phased material in the non-imaged areas. A still further object is to provide a lacquer which shows no evidence of bridging across the very small non-imaged dots in half-tone areas of high print density. A still further object is to provide a lacquer which can be used with lithographic images obtained by various types of light-sensitive resins including solvent soluble types and which shows good wearing characteristics on the press, is non-blinding in the image areas and non-tacky and scratch-resistant during the after processing. Another object is to provide a lacquer which, prior to drying, can be diluted with water without any adverse effects, and which is inert to the action of the ink, ink solvents, and fountain solution chemicals. Additional objects will be apparent from the following descriptions.

Lacquer for use with lithographic printing plates customarily contains an aqueous phase and a non-aqueous liquid phase. The water phase contains a soluble thickener, whereas the non-aqueous phase contains a resinous material. We have found that unexpected beneficial properties are obtained by using vinylidene chloride-acrylonitrile-unsubstituted lower alkyl acrylic ester terpolymers and vinylidene chloride - acrylonitrile - substituted lower alkyl acrylic ester terpolymers as the resinous material in the non-aqueous phase.

In one embodiment of our invention, a two-phase system is used comprising an aqueous phase and a solvent phase. A particularly useful material as the incorporated thickener in the aqueous phase is a copolymer of maleic anhydride and vinyl methyl ether in the amide form. However, other thickeners may be used such as polysaccharides, including polysaccharide gum from natural sources, such as seaweed derivatives and the like. Other polysaccharides include those identified as polysaccharide carboxy ethers. Gum arabic is also useful as is carboxymethyl cellulose. A concentration of 0.10–1.0 of the thickener in the lacquer appears most useful, but the concentration can be varied depending upon the viscosity desired.

For some purposes, a wetting agent such as sodium lauryl sulfate may be included. Other suitable surfactants or emulsifiers for the aqueous phase include the large class of anionic surfactants comprising the alkyl sulfates and sulfonates, alkylaryl sulfonates, such as the Duponols and Alkanols. Nonionic surfactants derived from alkyl phenol-ethylene oxide adducts are also useful such as the Igepals, Makons, Tergitols, and Dowfax. Non-ionic surfactants derived from ethylene oxide adducts of propylene oxide-propylene glycol block polymers such as the Pluronics are useful. Ethylene oxide adducts of sorbitan palmitate, laurate, oleate, and stearates are also useful. This class of surfactants is marketed under the Tween trade name. Cationic surfactants such as Alkaterage C, a substituted oxazoline, are useful. Solvent soluble surfactants found most useful for the organic phase are the Spans, sorbitan esters of lauric, palmitic, stearic and oleic acids; and the Igepons, particularly Igepon AC–78, the coconut oil ester of sodium isethionate.

In the solvent phase, a solvent which is usefully water-immiscible is employed which contains the vinylidene chloride-acrylonitrile-lower alkyl acrylic ester terpolymer or a vinylidene chloride-acrylonitrile-substituted lower alkyl acrylic ester terpolymer. A color material such as a dye, pigment, or lake is also incorporated in the solvent phase. The color material optionally can be the same ink that is to be used in the resulting printing operation as described in copending application No. 505,041, filed Oct. 25, 1965 by Houle and Van Norman. The aqueous phase and the solvent phase are combined and emulsified using conventional equipment such as a variable speed impeller type mixer.

It will be appreciated that the resulting emulsion can be either a water-in-oil emulsion or an oil-in-water emulsion. For some purposes it will be preferable to have an aqueous external phase comprising water and a soluble thickener with an internal non-aqueous liquid phase comprising the aforementioned acrylic ester containing terpolymers and water-immiscible volatile solvent. For other purposes, it will be desirable to have an internal aqueous phase comprising water and a soluble thickener and an external non-aqueous liquid resinous phase comprising the aforementioned acrylic ester containing terpolymers and an immiscible volatile solvent.

After the light-sensitive resin, such as that obtained on a presensitized diazo plate has been exposed and processed with a suitable solution to remove the soluble areas, the lacquer is applied while the plate is wet and rubbed into the image areas to produce a uniform and sharply delineated image. After removing the excess lacquer, the plate is dried and placed on the press, inked, and used to prepare lithographic prints.

The aforementioned acrylic ester containing terpolymers may be prepared by known methods such as emulsion polymerization or the like. Especially useful terpolymers containing acrylic ester are the lower alkyl acrylic ester terpolymers comprising vinylidene chloride-acrylonitrile-lower alkyl acrylic ester. These terpolymers may have a vinylidenechloride content which can be varied. A particularly useful range has from about 40–80% vinylidene cholride, about 1–25% acrylonitrile and about 1–40% lower alkyl acrylic ester especially wherein the lower alkyl acrylic ester may be a lower alkyl acrylate residue wherein the lower alkyl has 1–4 carbon atoms e.g. methyl acrylate, ethyl acrylate, etc. or a lower alkyl alkacrylate, wherein the lower alkyl has 1–4 carbon atoms, and where the alk-prefix in alkacrylate represents an alkyl group of 1–2 carbon atoms e.g. methyl methacrylate, ethyl methacrylate, butyl methacrylate. Other especially useful acrylic ester containing terpolymers are the vinylidene chloride-acrylonitrile-substituted lower alkyl acrylic ester terpolymers such as vinylidene chloride-acrylonitrile-hydroxy substituted lower alkyl acrylic ester terpolymers. Especially useful examples of these terpolymers are terpolymers wherein the hydroxy substituted lower alkyl acrylic ester residues are hydroxypropyl acrylate and hydroxypropyl methacrylate. Here again the vinylidene chloride content can be varied. A particularly useful range is from about 40–80% vinylidene chloride, about 1–25% acrylonitrile and about 1–40% substituted lower alkyl acrylic ester. With respect to the above-described substituted and unsubstituted acrylic ester containing terpolymers it will be appreciated that other ratios of the monomeric substituents may be used providing the products are sufficiently soluble in the solvent stage.

The molecular weight of the resulting polymer may also be varied but an especially useful molecular weight range is characterized by an inherent viscosity of from about 0.10 to 0.65, particularly from about 0.15 to 0.25 deciliter/gram in dimethyl formamide.

The terpolymer is most usefully employed in the lacquer in a concentration of about 1–10 percent but an extender may be used in the solvent phase as an addition to or partial substitute for the terpolymer to vary the processing characteristics of the lacquer. Useful extender compounds include, inter alia, plasticizers for resins such as, for example, dioctyl phthalate, etc. A particularly useful compound is a para-toluene sulfonamide-formaldehyde condensate. Up to about 50% of the copolymer may be substituted by suitable extenders.

The coloring matter can be a dye, a pigment, or a lake or a combination of these providing it is preferentially wet by the oleophilic binder or the solvent and provides a color which delineates the image. A large number of these compounds are useful but a phthalocyanine blue pigment, such as (Color Index No. 47160) Bahama Blue Lake, is particularly useful due to the ease of dispersing and wetting, uniformity of the dispersion, etc.

The immiscible solvent used for the oil phase is a matter of choice providing that it is a solvent for the aforementioned acrylic ester containing terpolymers and is immiscible in water. A particular choice may also depend upon toxic properties, volatility, and the like. However, a particularly useful solvent is 3-heptanone. Other useful solvents include other ketones, etc., mixtures of solvents, etc.

The lithographic printing plates on which these lacquers may be used include those prepared by diazo resins as well as other light-sensitive coatings including the solvent-soluble types. Once the image has been obtained, the lacquer of our invention can be used to improve the thickness of the image, its printing properties and the like. These images may be on metal supports, such as aluminum, zinc, etc. or on other types of supports, such as paper, polymeric substrates made of synthetic material such as polyesters, polyolefins, polystyrenes, etc.

The following examples are intended to illustrate our invention but not to limit it in any way.

EXAMPLE 1

Terpolymer preparation

The following components were placed in a 1-liter round-bottom fluted 3-neck flask equipped with a variable speed impeller stirrer and a cold water condenser.

| | Gm. |
|---|---|
| Water | 400 |
| Lauryl alcohol sulfate | 4 |
| Vinylidene chloride | 66.5 |
| Acrylonitrile | 3.5 |
| Methyl acrylate | 30 |
| 1-dodecanethiol | 4 |
| Potassium persulfate | 1 |
| Sodium bisulfate | 1.25 |

The flask was thermostatted at 30° C. and the contents stirred for 6 hours. The emulsion was coagulated by pouring the latex into isopropyl alcohol thereby producing a solid polymer having very fine particles. The resulting polymer was isolated by filtering through a paper filter using a Buchner funnel, washed several times and dried at 140° F. The apparent inherent viscosity (.25 g./100 ml.) in N,N-dimethyl formamide is 0.15–.20 deciliter per gram. The polymer thus obtained contains approximately 66.5% vinylidene chloride, 3.5% acrylonitrile and 30% methyl acrylate. The other terpolymers having the compositions indicated above are prepared similarly using the indicated proportions of the three monomers since polymerization goes substantially to completion, i.e. 40 to 80 parts vinylidene chloride, 1 to 25 parts acrylonitrile and 1 to 40 parts acrylic ester in the polymerization mixture.

EXAMPLE 2

A lacquer formulation containing the following ingredients was prepared according to the general method outlined below:

| | Weight percent |
|---|---|
| Naphthanil Red Dark | 1.5 |
| Coconut oil acid ester of sodium isethionate | 0.075 |
| Vinylidene chloride-acrylonitrile-methyl acrylate | 5.0 |
| 3-heptanone | 26.0 |
| Sodium lauryl sulfate | 0.50 |
| Polysaccharide gum | 0.25 |
| Water | 66.68 |

The pigment, terpolymer, coconut oil acid ester and 3-heptanone are ball-milled for 16–20 hours in a porcelain jar containing ¾ inch porcelain cylinders at 75° F. This system is then added, with efficient mixing, to a water solution containing the remaining ingredients and the solution is stirred for 8–10 minutes. Optionally the formulation may include formaldehyde-p-toluene-sulfonamide resin in the pigmented phase. Similarly the 3-heptanone and part of the terpolymer may be omitted from the mill grind and added after the milling operation. The above composition, as prepared, results in a dispersion in which polymer is present in the non-aqueous internal phase. By adding the water solution of the surfactant and gum to the mixture of pigment, solvent, terpolymer and ester, the aqueous phase becomes the internal phase. Similar lacquer dispersions are prepared using the ingredients shown in Examples 3–15 below.

The following lacquer formulations are prepared in a manner similar to that shown in Example 2.

EXAMPLE 3

| | Weight percent |
|---|---|
| Monastral Blue BF | 1.5 |
| Coconut oil acid ester of sodium isethionate | 0.075 |
| Vinylidene chloride-acrylonitrile-methyl acrylate | 5.0 |
| 3-heptanone | 20.5 |
| Sodium lauryl sulfate | 0.50 |
| Polysaccharide gum | 0.20 |
| Sodium salt of pentachlorophenol | 0.013 |
| Water | 72.2 |

EXAMPLE 4

| | Weight percent |
|---|---|
| Monastral Blue BF | 1.5 |
| Vinylidene chloride - acrylonitrile - hydroxypropyl methacrylate terpolymer | 3.0 |
| Coconut oil acid ester of sodium isethionate | 0.075 |
| 3-heptanone | 20.0 |
| Sodium lauryl sulfate | 0.75 |
| Polysaccharide gum | 0.45 |
| Sodium salt of pentachlorophenol | 0.03 |
| Water | 74.20 |

EXAMPLE 5

| | Weight percent |
|---|---|
| Monastral Blue BF | 1.50 |
| Coconut oil acid ester of sodium isethionate | 0.075 |
| Vinylidene chloride - acrylonitrile - hydroxypropyl methacrylate terpolymer | 5.00 |
| 3-heptanone | 20.0 |
| Sodium lauryl sulfate | 0.75 |
| Polysaccharide gum | 0.45 |
| Sodium salt of pentachlorophenol | 0.03 |
| Water | 72.2 |

EXAMPLE 6

| | Weight percent |
|---|---|
| Monastral Blue BF | 1.50 |
| Coconut oil acid ester of sodium isethionate | 0.075 |
| Vinylidene chloride - acrylonitrile - hydroxypropyl methacrylate terpolymer | 3.0 |
| 3-heptanone | 20.0 |
| Sodium lauryl sulfate | 0.25 |
| Polysaccharide gum | 0.20 |
| Sodium salt of pentachlorophenol | 0.013 |
| Water | 74.97 |

EXAMPLE 7

| | Weight percent |
|---|---|
| Monastral Blue BF | 1.50 |
| Coconut oil acid ester of sodium isethionate | 0.075 |
| Vinylidene chloride - acrylonitrile - methyl acrylate terpolymer | 3.0 |
| Formaldehyde-p-toluene sulfonamide resin | 4.0 |
| 3-heptanone | 20.0 |
| Sodium lauryl sulfate | .50 |
| Polysaccharide gum | .30 |
| Sodium salt of pentachlorophenol | .02 |
| Water | 70.61 |

EXAMPLE 8

| | Weight percent |
|---|---|
| Naphthanil Red Dark | 2.0 |
| Coconut oil acid ester of sodium isethionate | .10 |
| Vinylidene chloride-acrylonitrile-methyl acrylate terpolymer | 5.0 |
| 3-heptanone | 27.5 |
| Sodium lauryl sulfate | .50 |
| Polysaccharide gum | .30 |
| Sodium salt of pentachlorophenol | .02 |
| Water | 64.58 |

EXAMPLE 9

| | Weight percent |
|---|---|
| Naphthanil Red Dark | 1.50 |
| Sorbitan tristearte | .15 |
| Vinylidene chloride-acrylonitrile-methyl acrylate terpolymer | 5.0 |
| 3-heptanone | 28.0 |
| Sodium lauryl sulfate | 0.50 |
| Polysaccharide gum | 0.25 |
| Sodium salt of pentachlorophenol | .16 |
| Water | 64.24 |

EXAMPLE 10

| | Weight percent |
|---|---|
| Naphthanil Red Dark | 1.35 |
| Sorbitan tristearate | 0.135 |
| Vinylidene chloride-acrylonitrile-methyl acrylate terpolymer | 4.0 |
| Formaldehyde-p-toluene sulfonamide resin | 1.5 |
| 3-heptanone | 27.0 |
| Sodium lauryl sulfate | .50 |
| Polysaccharide gum | .30 |
| Sodium salt of pentachlorophenol | .02 |
| Water | 65.80 |

EXAMPLE 11

| | Weight percent |
|---|---|
| Naphthanil Red Dark | 1.35 |
| Sorbitan monopalmitate | 0.135 |
| Vinylidene chloride-acrylonitrile-methyl acrylate terpolymer | 4.0 |
| Formaldehyde-p-toluene sulfonamide resin | 1.5 |
| 3-heptanone | 27.0 |
| Sodium lauryl sulfate | .50 |
| Polysaccharide gum | .30 |
| Sodium salt of pentachlorophenol | .02 |
| Water | 65.80 |

EXAMPLE 12

| | Weight percent |
|---|---|
| Naphthanil Red Dark | 1.35 |
| Sorbitan tristearate | 0.135 |
| Vinylidene chloride-acrylonitrile-methyl acrylate terpolymer | 4.0 |
| Formaldehyde-p-toluene sulfonamide resin | 1.5 |
| 3-heptanone | 27.0 |
| Sodium salt of alkylaryl polyether sulfate (Triton 770) | 1.0 |
| Polysaccharide gum | .30 |
| Sodium salt of pentachlorophenol | .02 |
| Water | 64.70 |

EXAMPLE 13

| | Weight percent |
|---|---|
| Naphthanil Red Dark | 1.35 |
| Sorbitan tristearate | .135 |
| Vinylidene chloride-acrylonitrile-methyl acrylate terpolymer | 7.0 |
| 3-heptanone | 27.0 |
| Sodium lauryl sulfate | .50 |
| Polysaccharide gum | .30 |
| Sodium salt of pentachlorophenol | .02 |
| Water | 63.70 |

EXAMPLE 14

| | Weight percent |
|---|---|
| Naphthanil Red Dark | 1.35 |
| Sorbitan tristearate | .135 |
| Vinylidene chloride-acrylonitrile-methyl acrylate terpolymer | 4.0 |
| Formaldehyde-p-toluene sulfonamide resin | 1.5 |
| 3-heptanone | 27.0 |
| Sodium lauryl sulfate | .50 |
| Polysaccharide gum | .60 |
| Sodium salt of pentachlorophenol | .04 |
| Water | 64.88 |

EXAMPLE 15

| | Weight percent |
|---|---|
| Naphthanil Red Dark | 1.35 |
| Sorbitan tristearate | .135 |
| Vinylidene chloride-acrylonitrile-methyl acrylate terpolymer | 4.0 |
| Formaldehyde-p-toluene sulfonamide resin | 1.5 |
| 3-heptanone | 40.0 |
| Sodium lauryl sulfate | .50 |
| Polysaccharide gum | .30 |
| Sodium salt of pentachlorophenol | .02 |
| Water | 52.30 |

The lacquers thus prepared, when applied to and rubbed on a presensitized, diazo, grained aluminum plate after a suitable exposure through negative copy and after processing with a suitable desentizing solution and while still wet therefrom produced a uniform and sharply delinated image very quickly. More significantly, as compared to previously utilized lacquers the lacquers described above were found to result in a large reduction in the scum level of the unexposed portions of naturally aged plates or plates undergoing accelerated keeping tests. This was especially true in the vinylidene chloride-acrylonitrile-methyl acrylate terpolymer lacquer composition. Since scum, analogous to fog in photographic film, is entirely undesirable, a reduction in scum increases the utility and useful life of the plate. Utilizing the lacquers containing the terpolymer compositions also results in the plates wearing better on the press than previously utilized plates, especially where vinylidene chloride-acrylonitrile-methyl acrylate terpolymer lacquer compositions are used. The lacquer composition described above also results is smoother and more uniform solids in the processed plates.

The lacquers of our invention can be applied to lithographic printing plates and the images thereon produced from various light sensitive resins. As previously mentioned longer wearing plates are obtained on which the image areas are clearly delineated and which are particularly receptive to greasy printing inks. The compositions and applications are particularly advantageous with lithographic plates of the type described in the Houle et al. application Ser. No. 347,931, now Pat. No. 3,342,601.

The invention has been described in considerable detail with particular reference to preferred embodiments thereof, but it will be understood that variations and modifications can be effected within the spirit and scope of the invention as described hereinabove and as defined in the appended claims.

We claim:

1. A lithographic printing plate image lacquer comprising a colored, two-phase liquid composition, having an aqueous phase comprising water and a soluble thickener, and a non-aqueous liquid, resinous phase comprising a vinylidene chloride-acrylonitrile-lower alkyl acrylic ester terpolymer, pigment or dye, and a water-immiscible volatile solvent.

2. A lithographic printing plate image lacquer as in claim 1 wherein the aqueous phase is an internal phase and the non-aqueous liquid, resinous phase is an external phase.

3. A lithographic printing plate image lacquer as in claim 1 wherein the aqueous phase is an external phase and the non-aqueous liquid resinous phase is an internal phase.

4. A lithographic printing plate image lacquer as in claim 2, further including a wetting agent in the aqueous phase.

5. A lithographic printing plate image lacquer as in claim 4, further including an extender for the terpolymer in the non-aqueous liquid, resinous phase.

6. A lithographic printing plate image lacquer as in claim 5 wherein the extender is a formaldehyde-p-toluene sulfonamide resin.

7. A lithographic printing plate image lacquer as in claim 5 wherein the thickener is a polysaccharide thickener.

8. A lithographic printing plate image lacquer as in claim 7 wherein the extender is a formaldehyde-p-toluene sulfonamide resin.

9. A lithographic printing plate image lacquer as in claim 8 wherein the water-immiscible volatile solvent comprises 3-heptanone.

10. A lithographic printing plate image lacquer as in claim 9 wherein the lower alkyl acrylic ester moiety is derived from a lower alkyl acrylate.

11. A lithographic printing plate image lacquer as in claim 10 wherein the lower alkyl acrylate moiety is derived from methyl acrylate.

12. A lithographic printing plate image lacquer as in claim 10 wherein the lower alkyl acrylate moiety is derived from hydroxy-propyl-acrylate.

13. A lithographic printing plate image lacquer as in claim 9 wherein the lower alkyl acrylic ester moiety is derived from a lower alkyl alkacrylate.

14. A lithographic printing plate image lacquer as in claim 13 wherein the lower alkyl alkacrylate moiety is derived from methyl methacrylate.

15. A lithographic printing plate image lacquer as in claim 13 wherein the lower alkyl alkacrylate moiety is derived from hydroxy-propyl-methacrylate.

16. A lithographic printing plate image lacquer is in claim 1 wherein the lower alkyl acrylic ester moiety is derived from a lower alkyl acrylate.

17. A lithographic printing plate image lacquer as in claim 16 wherein the lower alkyl acrylate moiety is derived from methyl acrylate.

18. A lithographic printing plate image lacquer as in claim 16 wherein the lower alkyl acrylate moiety is derived from hydroxy-propyl-acrylate.

19. A lithographic printing plate image lacquer as in claim 1 wherein the lower alkyl acrylic ester moiety is derived from a lower alkyl alkacrylate.

20. A lithographic printing plate image lacquer as in claim 19 wherein the lower alkyl alkacrylate moiety is derived from methyl methacrylate.

21. A lithographic printing plate image lacquer as in claim 19 wherein the lower alkyl alkacrylate moiety is derived from hydroxy-propyl-methacrylate.

References Cited

UNITED STATES PATENTS

| | | | |
|---|---|---|---|
| 2,538,737 | 1/1951 | Stanton et al. | |
| 2,865,873 | 12/1958 | Hodgins et al. | |
| 2,909,449 | 10/1959 | Banigan. | |
| 2,922,768 | 1/1960 | Mino et al. | 260—87.7 XR |
| 3,276,360 | 10/1966 | Stimson et al. | |
| 3,297,666 | 1/1967 | MacPherson | 260—29.6 XR |
| 3,311,579 | 3/1967 | Donat | 260—29.6 XR |
| 3,328,330 | 6/1967 | Trofimow et al. | 260—17.4 XR |

WILLIAM H. SHORT, Primary Examiner

E. A. NIELSEN, Assistant Examiner

U.S. Cl. X.R.

101—453, 457, 462, 466; 117—138.8, 161; 260—17.4, 29.6

PO-1050
(5/69)

UNITED STATES PATENT OFFICE
CERTIFICATE OF CORRECTION

Patent No. 3,525,704 Dated August 25, 1970

Inventor(s) Ronald M. Stimson and Gilden R. Van Norman

It is certified that error appears in the above-identified patent and that said Letters Patent are hereby corrected as shown below:

Column 7, lines 57-59: Delete "vinylidene chloride-acrylonitrile-lower alkyl acrylic ester terpolymer, pigment or dye, and a water-immiscible volatile solvent." and substitute therefor -- pigment or dye, a water-immiscible volatile solvent, and an acrylic ester containing terpolymer selected from the group consisting of vinylidene chloride-acrylonitrile-lower alkyl acrylic ester terpolymer and vinylidene chloride-acrylonitrile-hydroxy substituted lower alkyl acrylic ester terpolymer. --.

Column 8, line 23: Before "lower" insert -- hydroxy substituted --.

Column 8, line 32: Before "lower" insert -- hydroxy substituted --.

Column 8, line 41: Before "lower" insert -- hydroxy substituted --.

Column 8, line 50: Before "lower" insert -- hydroxy substituted --.

SIGNED AND SEALED
DEC 1 1970

(SEAL)
Attest:

Edward M. Fletcher, Jr.
Attesting Officer

WILLIAM E. SCHUYLER, JR.
Commissioner of Patents